(12) United States Patent
Cao et al.

(10) Patent No.: US 9,607,063 B1
(45) Date of Patent: Mar. 28, 2017

(54) NOSQL RELATIONAL DATABASE (RDB) DATA MOVEMENT

(71) Applicant: International Business Machines Corporation, Armonk, NY (US)

(72) Inventors: Zhao Cao, Beijing (CN); Lanjun Wang, Beijing (CN); Lin H. Xu, Beijing (CN); Kang Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/965,480

(22) Filed: Dec. 10, 2015

(51) Int. Cl.
   *G06F 17/30* (2006.01)
(52) U.S. Cl.
   CPC .. *G06F 17/30563* (2013.01); *G06F 17/30292* (2013.01); *G06F 17/30339* (2013.01); *G06F 17/30448* (2013.01); *G06F 17/30463* (2013.01); *G06F 17/30595* (2013.01)
(58) Field of Classification Search
   CPC ......... G06F 17/30563; G06F 17/30292; G06F 17/30339; G06F 17/30448; G06F 17/30463; G06F 17/30595
   USPC ...................................................... 707/602
   See application file for complete search history.

(56) References Cited

U.S. PATENT DOCUMENTS

| | | | |
|---|---|---|---|
| 8,589,450 B2 | 11/2013 | Xue et al. | |
| 8,732,213 B2 * | 5/2014 | Sowell | G06F 17/30911 707/809 |
| 2003/0033317 A1 * | 2/2003 | Ziglin | G06F 17/30557 |
| 2003/0208493 A1 * | 11/2003 | Hall | G06F 17/30607 |
| 2008/0320054 A1 * | 12/2008 | Howard | G06F 8/51 |
| 2010/0049710 A1 * | 2/2010 | Young, Jr. | G06F 17/30867 707/769 |
| 2012/0310878 A1 * | 12/2012 | Vuksan | G06F 17/30575 707/609 |
| 2013/0024484 A1 * | 1/2013 | Banerjee | G06F 17/30587 707/822 |
| 2014/0149400 A1 * | 5/2014 | Fu | G06F 17/30575 707/723 |
| 2015/0066995 A1 * | 3/2015 | Kwon | G06F 17/30569 707/809 |

FOREIGN PATENT DOCUMENTS

CN    103530327 A    1/2014

OTHER PUBLICATIONS

Anonymous, "Accessing Relational Data From a RDBMS From a NoSQL API", IP.com Electronic Publication: Feb. 28, 2014, 6 pages.

* cited by examiner

*Primary Examiner* — Mark E Hershley
*Assistant Examiner* — Hicham Skhoun
(74) *Attorney, Agent, or Firm* — Scully, Scott, Murphy & Presser, P.C.; Alexa L. Ashworth

(57) ABSTRACT

Automatically moving NoSQL data store to a relational database system. Based on discovered data structure schema of a NoSQL file and query plans, attribute usage and association relationships may be determined. Trunk tables may be defined based on trunk part of the data structure schema determined based on the attribute usage. Trunk tables are validated and relational database tables are generated that correspond to the trunk tables. NoSQL trunk template is generated based on the trunk tables. The relational database tables are loaded with data filtered from the NoSQL file according to the NoSQL trunk template.

10 Claims, 13 Drawing Sheets

```
{" object1 ": {
    "attributes": {
        "_id": {"type" : "String", "max_Length": 32},
        "discussionId": {"type" : "String", "max_Length": 36},
        "text":{"type": "String", "max_Length": 200},
        "author": {
            "type" : "userdefined",
            "attributes" : {
                "ID: {"type" : "String" , "max_Length": 2},
                "Name": {"type" : "String" , "max_Length":10}}}}}
```

FIG. 2A

```
CREATE TABLE object1(
    _id varchar(32) unique,
    discussionID varchar(36),
    author_ID varchar(20),
    author_name varchar(20),
    text varchar(200)
)
```

FIG. 2B

```
CREATE TABLE object1(
    _id varchar(32) unique,
    _rev varchar(32),
    customerId varchar(36),
    address_state varchar(2),
    address_localphone varchar(10),
    address_city varchar (20),
    lastname: varchar(20),
    firstname varchar(20),
    orders_arrid: Integer
    orders_status: varchar(20),
    ......
    favorites_arrid: Integer
    favorites: varchar(20))
```

FIG. 3A

```
{
  "_id": "138cdf24a77e1aa573ce674564000caf",
  "_rev": "1-821b7cbb2ae98b3580809f9cac4345c8",
  "customerId": "4c248f8a-8d93-4947-8f5a-b64ca05a7869",
  "address": {
    "state": "ca",
    "localphone": "6587186",
    "city": "custer"
  },
  "lastname": "Biglar",
  "firstname": "Bala",
  "orders": [
    {
      "status": "closed",
      "ordid": 73,
      "comments": "Dryer shorted",
      "filedon": "2012-09-21"
    }, {
      "status": "processing",
      "ordid": 128,
      "comments": "Dryer shorted",
      "filedon": "2013-06-21"
    }
  ],
  "favorites": [
    "Sports", "Shopping"
  ],
  "complain": 1
}
......
```

FIG. 3B

QUERY 1

SELECT CUSTOMERID, COMPLAIN
FROM OBJECT1 ORDER BY COMPLAIN

QUERY 2

SELECT ADDRESS.CITY AS CITY ADDRESS.STATE AS STATE,
COUNT(*) AS CUSTOMER
FROM OBJECT1 GROUP BY (STATE,CITY)

QUERY 3

SELECT CUSTOMERID FROM OBJECT1
WHERE ORDER.STATUS = "PROCESSING"

FIG. 6

```
{
  "object1": {
    "attributes": {
      "_id": {"type" : "String", "max_Length": 32},
      "_rev": {"type" : "String", "max_Length": 32},
      "customerId": {"type" : "String", "max_Length": 36},
      "address": {
        "type" : "userdefined",
        "attributes"   : {
          "state": {"type" : "String" , "max_Length": 2},
          "localphone": {"type" : "String" , "max_Length":10},
          "city": {"type" : "String" , "max_Length": 20}
        }
      }
      "lastname": {"type" : "String" , "max_Length": 20},
      "firstname": {"type" : "String" , "max_Length": 20},
      "orders":{
        "type" : "userdefined",
        "repeated" : "true",
        "attributes" : {
          "status": {"type" : "String" , "max_Length": 10},
          "ordid": {"type" : "Integer"},
          "comments": {"type" : "String" , "max_Length": 32},
          "filedon": {"type" : "String" , "max_Length": 10}
        }
      },
      "favorites": {"type" : "String" , "max_Length": 16, "repeated" : true },
      "complain": {"type" : "Integer}
}}}
```

FIG. 7A

```
CREATE TABLE object1(
    _id varchar(32) unique,
    customerId varchar(36),
    address_city varchar (20),
    address_state varchar (2),
    complain integer,
    PRIMARY KEY _id)
```

FIG. 7B

```
CREATE TABLE object1_orders (
    _id   varchar(32) not null,
    arrayindex Integer not null,
    status varchar(2),
    FOREIGN KEY ("_id") REFERENCES object_1("_id")
```

FIG. 7C

```
CREATE TABLE object1(
    _id varchar(32) unique,
    customerId varchar(36),
    complain integer,
    PRIMARY KEY _id )
```

FIG. 9A

```
CREATE TABLE  object1_address (
    _id varchar(32) not null,
    state varchar(2),
    city varchr(16)
    FOREIGN KEY ("_id")  REFERENCES object_1("_id"))
```

FIG. 9B

```
CREATE TABLE   object1_orders (
    _id varchar(32) not null,
    arrayindex Integer not null,
    status varchar(2),
    FOREIGN KEY ("_id")  REFERENCES object_1("_id")
```

FIG. 9C

```
CREATE TABLE object1(
  _id varchar(32) unique,
  customerid varchar(36),
  address_city varchar(20),
  complain integer,
  PRIMARY KEY (_id))
```

FIG. 10A

```
CREATE TABLE object1_orders(
  _id varchar(32) not null,
  arrayindex integer not null,
  status varchar(2),
  FOREIGN KEY ("_id") REFERENCES
  object_1("_id"))
```

FIG. 10B

```
{
  "object1": {
    "attributes": {
      "customerid": {"type" : "String", "max_Length": 36},
      "address": {
        "type" : "userdefined",
        "attributes": {
          "city": {"type" : "String" , "max_Length": 20}
        }
      },
      "orders": {
        "type" : "userdefined",
        "repeated" : "true",
        "attributes" : {
          "status": {"type" : "String" , "max_Length": 10}
        }
      },
      "complain": {"type" : "Integer}
    },
  }
}
```

FIG. 10C

NOSQL RELATIONAL DATABASE (RDB) DATA MOVEMENT

FIELD

The present application relates generally to computers and computer applications, and more particularly to migrating data between a NoSQL data store and a relational data base system.

BACKGROUND

NoSQL data stores are very popular. NoSQL data stores offer lower-cost data management platform, provide elastic or automatic scale in and out capabilities, and data model flexibility. However, the native NoSQL is difficult to use in data analytics. The present disclosure discloses moving data from NoSQL data stores to data warehouse that stores relational database.

BRIEF SUMMARY

A computer-implemented method and system of automatically moving NoSQL data store to a relational database system may be provided. The method, in one aspect, may include receiving a NoSQL file stored in a storage device. The method may also include discovering data structure schema of the NoSQL file. The method may further include receiving one or more query plans associated with one or more records in the NoSQL file. The method may also include determining attribute usage associated with the data structure schema and association relationships in the data structure schema based on the one or more query plans. The method may further include determining trunk part of the data structure schema based on the attribute usage. The method may also include defining one or more trunk tables corresponding to the trunk part based on a rule-based table generation. The method may further include validating the one or more trunk tables according to constraints of the relational database system. The method may further include generating one or more corresponding relational database system tables corresponding to the one or more trunk tables. The method may also include generating a NoSQL trunk template based on the one or more trunk tables. The method may further include filtering the NoSQL file to extract data corresponding to the NoSQL trunk template. The method may also include loading the data filtered from the NoSQL file into the one or more corresponding relational database system table. The method may further include loading the data that is not filtered in the NoSQL file into an overflow table with respective key value pairs.

A system of moving NoSQL data store to a relational database system tables, in one aspect, may comprise one or more processors. One or more of the processors may be operable to receive a NoSQL file stored in a storage device. One or more of the processors may be further operable to discover data structure schema of the NoSQL file. One or more of the processors may be further operable to receive one or more query plans associated with one or more records in the NoSQL file. One or more of the processors may be further operable to determine attribute usage associated with the data structure schema and association relationships in the data structure schema based on the one or more query plans. One or more of the processors may be further operable to determine trunk part of the data structure schema based on the attribute usage. One or more of the processors may be further operable to define one or more trunk tables corresponding to the trunk part based on a rule-based table generation. One or more of the processors may be further operable to validate the one or more trunk tables according to constraints of the relational database system. One or more of the processors may be further operable to generate one or more corresponding relational database system tables corresponding to the one or more trunk tables. One or more of the processors may be further operable to store the one or more corresponding relational database system tables on a storage device coupled to one or more of the processors.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2A illustrates an example NoSQL data store, for example, input to a method of the present disclosure in one embodiment.

FIG. 2B illustrates an example relational database table definition created based on the input NoSQL data in one embodiment of the present disclosure.

FIG. 3A is an example table flattened according to an embodiment of a method in the present disclosure.

FIG. 3B is an example NoSQL data used to create the relational database table shown in FIG. 3A in one embodiment of the present disclosure.

FIG. 6 illustrates example queries received, which may be used to detect attribute usage in one embodiment of the present disclosure.

FIG. 7A is an example JSON data structure from which one or more trunk tables may be defined in one embodiment of the present disclosure.

FIG. 7B and FIG. 7C show examples of trunk table pre-defined based on frequent attributes detected in the data structure shown in FIG. 7A in one embodiment of the present disclosure.

FIGS. 9A, 9B and 9C illustrate tables that are split based on detected association relationships in one embodiment of the present disclosure.

FIG. 10A and FIG. 10B show RDB tables created in one embodiment of the present disclosure.

FIG. 10C shows an example of a trunk JSON template generated based on the two RDB tables shown in FIG. 10A and FIG. 10B in one embodiment of the present disclosure.

DETAILED DESCRIPTION

A system, method and techniques for migrating NoSQL data store to a relational database system (RDBS) are disclosed. A NoSQL database or data store stores and retrieves data that is formatted or modeled in non relational database format, for instance, not in tabular relations form. Moving NoSQL data store to a relational database system or store, for example, may help in data analytics, for instance, by allowing analytics related functions to be employed (e.g., join, aggregation operators), providing faster performance, and also for readily adapting to existing data analytics tools that may embed relational databases in their functions and applications that implement native sequential query languages (SQLs).

Figure 1:
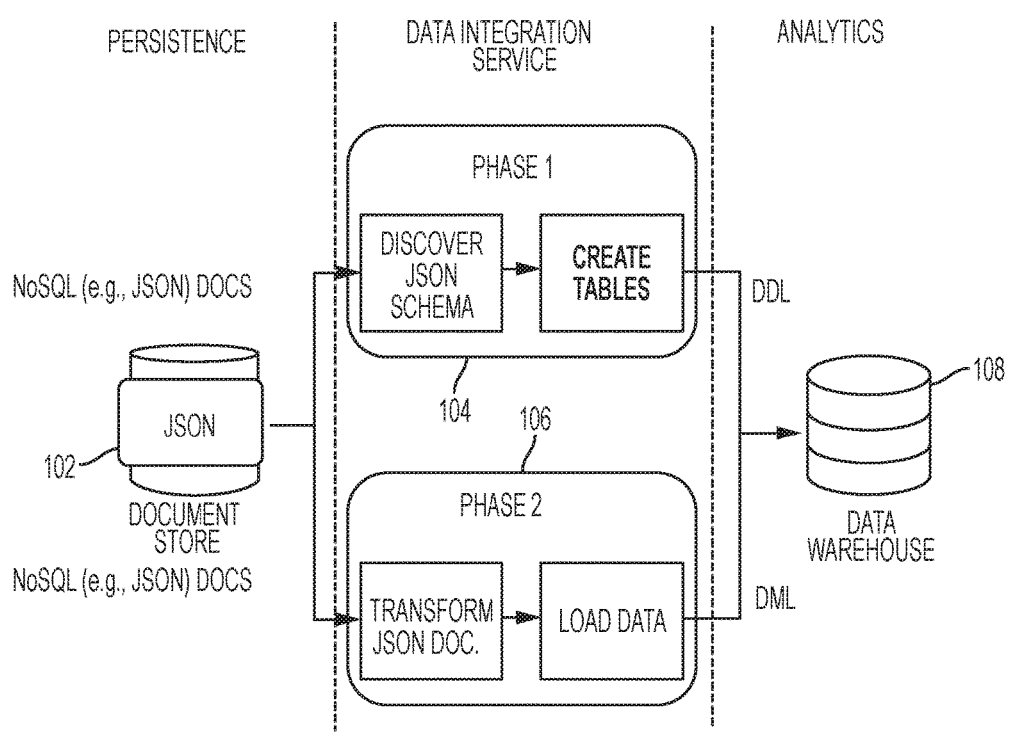
FIG. 1 is a diagram illustrating an overview of NoSQL data store to RDB migration in one embodiment of the present disclosure.

FIG. 1 is a diagram illustrating an overview of NoSQL data store to RDB migration in one embodiment of the present disclosure. FIG. 2A illustrates an example NoSQL data store, for example, input to a method of the present disclosure in one embodiment. FIG. 2B illustrates an example relational database table definition created based on the input NoSQL data in one embodiment of the present disclosure. Referring to FIG. 1, NoSQL data that, for example, resides in a persistent storage 102 may be input. An example NoSQL document may include JavaScript Object Notation (JSON) document. It is noted that while JSON is used to describe an example of a NoSQL data store, the methodology of the present disclosure in one embodiment does not limit NoSQL data store only to JSON. A document or computer file containing NoSQL data may be input to a data integration service of the present disclosure in one embodiment. Phase 1 104 of the data integration service may discover the NoSQL data schema of the input document or file, for example, shown in FIG. 2A. Phase 1 104 may also create a relational database table definition, for example, shown in FIG. 2B, based on the discovery. Phase 2 106 of the data integration service may transform the NoSQL data document and load the data into a relational database data warehouse. The data is stored according to the created relational database table definition. The RDB data tables may be stored in a data warehouse 108, for example, which can be used in performing an analytics.

NoSQL, for example, JSON data structure is complex in that the data structure includes objects and arrays, and objects and arrays embedded in one another. Relational database (RDB) also has its own complexities. RDB operates with constraints such as the number of tables, number of columns, and length of column name. For instance, a user setting up a relational database may set the constraints. Further, the number of columns multiplied by a data structure type's length need to be less than or equal to the page size. Moreover, relationship between tables cannot be too complex.

The method in one embodiment flattens the structure into a table, e.g., a wide table. FIG. 3A is an example table flattened according to an embodiment of a method in the present disclosure. FIG. 3B is an example NoSQL data used to create the relational database table shown in FIG. 3A in one embodiment of the present disclosure.

Figure 4:
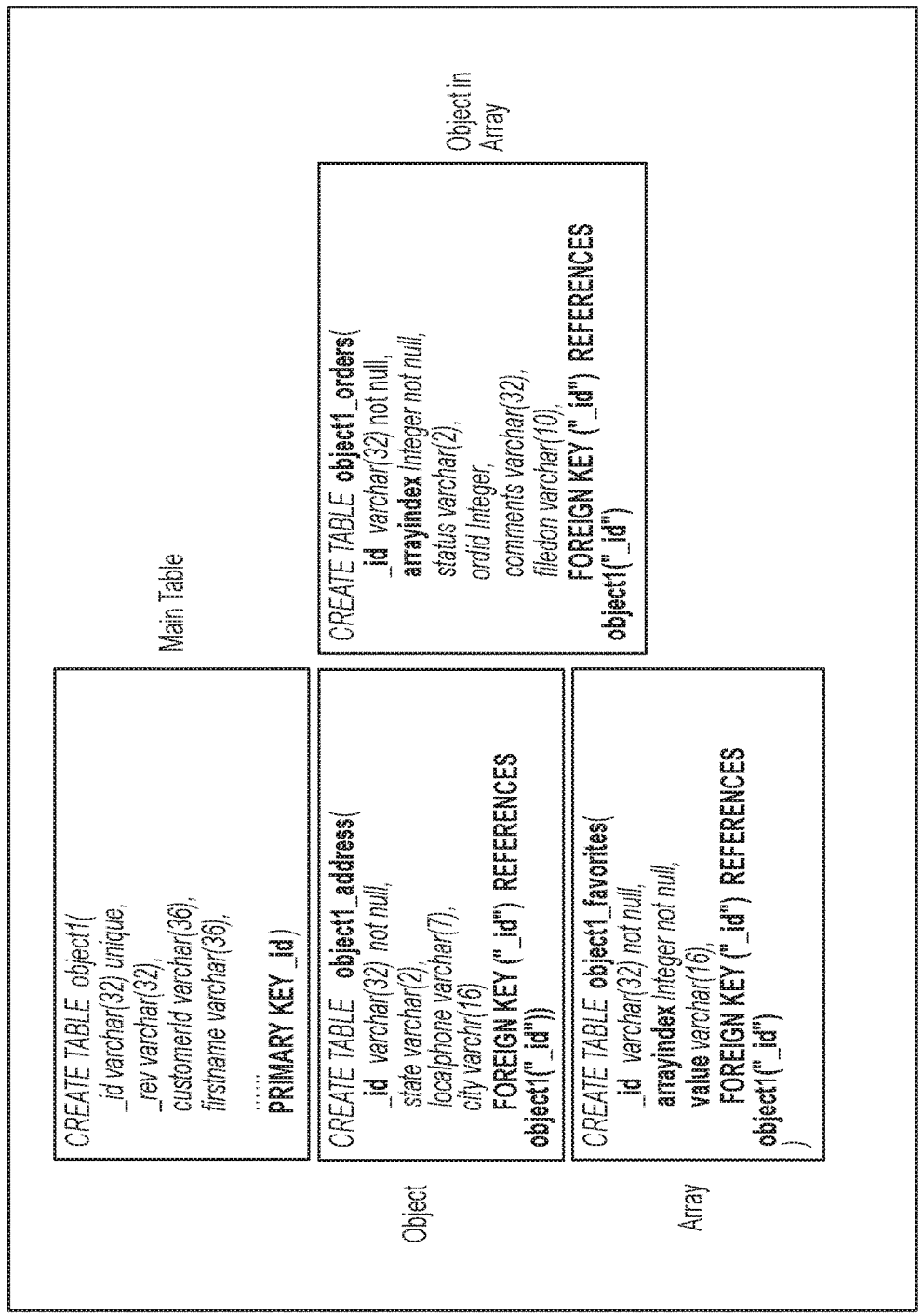
FIG. 4 illustrates a plurality of single tables created from discovering data in the example NoSQL document shown in FIG. 3B.

The method may parse embedded objects and arrays into single table. FIG. 4 illustrates a plurality of single tables created from discovering data in the example NoSQL document shown in FIG. 3B.

Figure 5:
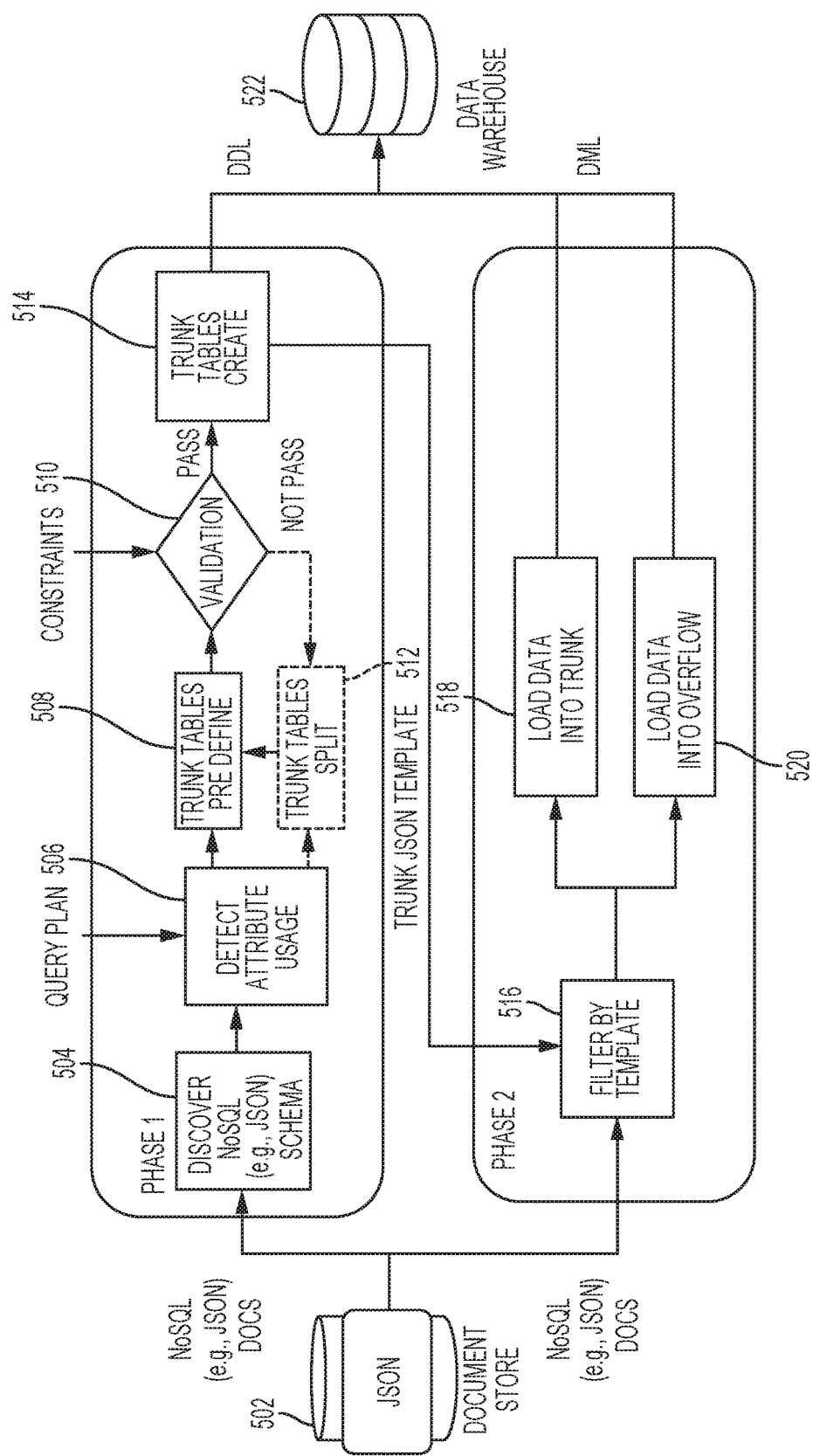
FIG. 5 illustrates system architecture in one embodiment of the present disclosure.

FIG. 5 illustrates system architecture for automatic data movement from NoSQL to RDB in one embodiment of the present disclosure. Phase 1 component, for example, generates a table. Phase 2 component loads data. The Phase 1 and Phase 2 components shown in FIG. 5 execute on one or more hardware processors which may be networked, and couple with one or more storage devices.

In one embodiment of the present disclosure, the automatic data movement from NoSQL to RDB may be implemented with trunk detection based table generation. Such technique may include attribute usage analysis based on query plan, defining trunk tables, e.g., containing all frequent attributes, based on rule-based table generation, validating constraints for table generation, and if failed, splitting the table based on association relationships of attributes, and generating a trunk JSON template for data loading.

For example, a part of JSON structure which contains most information and often used in data analytics may be flattened. Flattening removes the hierarchical data structure in NoSQL. In one embodiment, flattening may include linking the hierarchical keys by a specified symbol. For example, NoSQL record {"name":{"firstname": "June", "givenname": "Wang"} } may be flattened to name_firstname and name_lastname. Whether the NoSQL structure has most information may be determined based on one or more query plans. The remainder part of JSON structure may be transformed to vertical and mix tables (overflow tables). Vertical and mix table refers to a table with two columns: first column stores an attribute name and the second column stores the corresponding attribute value. If splitting the table is needed, the attributes that appear in the same query are placed in the same table, e.g., to avoid join in data analytics. Splitting may be needed to meet RDB table or data structure constraints.

Referring to FIG. 5, NoSQL document, e.g., stored in a storage device 502, may be input to or received at a processing module executing on one or more hardware processors. The processing module 504 discovers the NoSQL data structure. A query plan may be received and a detect attribute usage processing module 506, based on the query plan, detects attribute usage of the attributes or data structure discovered in the NoSQL document or file. FIG. 6 illustrates example queries received, which may be used to detect attribute usage in one embodiment of the present disclosure. The detect attribute usage processing module 506 may analyze one or more received query plans and determine attributes that occur frequently in the query plans, for example, using text analysis techniques. In the example queries shown in FIG. 6, frequent attributes are determined to be: customerId, complaint, address.city, address.state, order. Status. The detect attribute usage processing module 506 may also determine the association relationships among the attribute, for instance, using text analysis techniques. For instance, in the example queries, the following association relationships may be detected: customerId, complain, order.status; and address.city, address.state.

A trunk table pre-define processing module 508 defines a trunk table based on the detected attribute usage, e.g., using on a rule-based table generation method. For example, for an embedded object, the trunk table pre-define processing module 508 supports arbitrary levels of nesting by unfolding each attribute individually, adding a '_' between names at each level, for example, like dotted notation. An example NoSQL record {"_id": 1, "name":{"firstname": "June", "lastname": "Wang"} } may be transformed to an RDB table with table name of object1_name and table content as follows:

| _id | firstname | lastname |
|-----|-----------|----------|
| 1   | June      | Wang     |

For an array, the trunk table pre-define processing module 508 in one embodiment extracts arrays and store them vertically so that each value is in its own row for quick and efficient access. As an example, NoSQL array {"_id": 1, "fruits":["apple", "peach", "pear"]} may be transformed to a corresponding RDB table with table name object1_fruits:

| _id | ArrayID | value |
|-----|---------|-------|
| 1   | 1       | apple |
| 1   | 2       | peach |
| 1   | 3       | pear  |

For an embedded object in an array, the trunk table pre-define processing module 508 extracts arrays of complex objects and stores them vertically so that each object is flattened as in the processing for an embedded object. Complex objects have combination of arrays and objects embedded, for example, {"_id": 1, "name":[{"firstname": "June", "lastname": "Wang"}, {"firstname": "Robert", "lastname": "Ho"}]}. The corresponding RDB table may be generated as follows:

| _id | ArrayId | Firstname | lastname |
|-----|---------|-----------|----------|
| 1   | 1       | June      | Wang     |
| 1   | 2       | Robert    | Ho       |

FIG. 7A is an example JSON data structure from which one or more trunk tables may be defined. FIG. 7B and FIG. 7C show examples of trunk table pre-defined based on frequent attributes detected in the data structure shown in FIG. 7A.

Referring to FIG. 5, at 510, the trunk table defined at 508 may be validated based on the RDB requirements, for example, page size, length of table name, length of column name, and number of columns. At 512, if the validation fails, the trunk table may be split based on one or more association relationships of attributes detected at 506.

Figure 8:
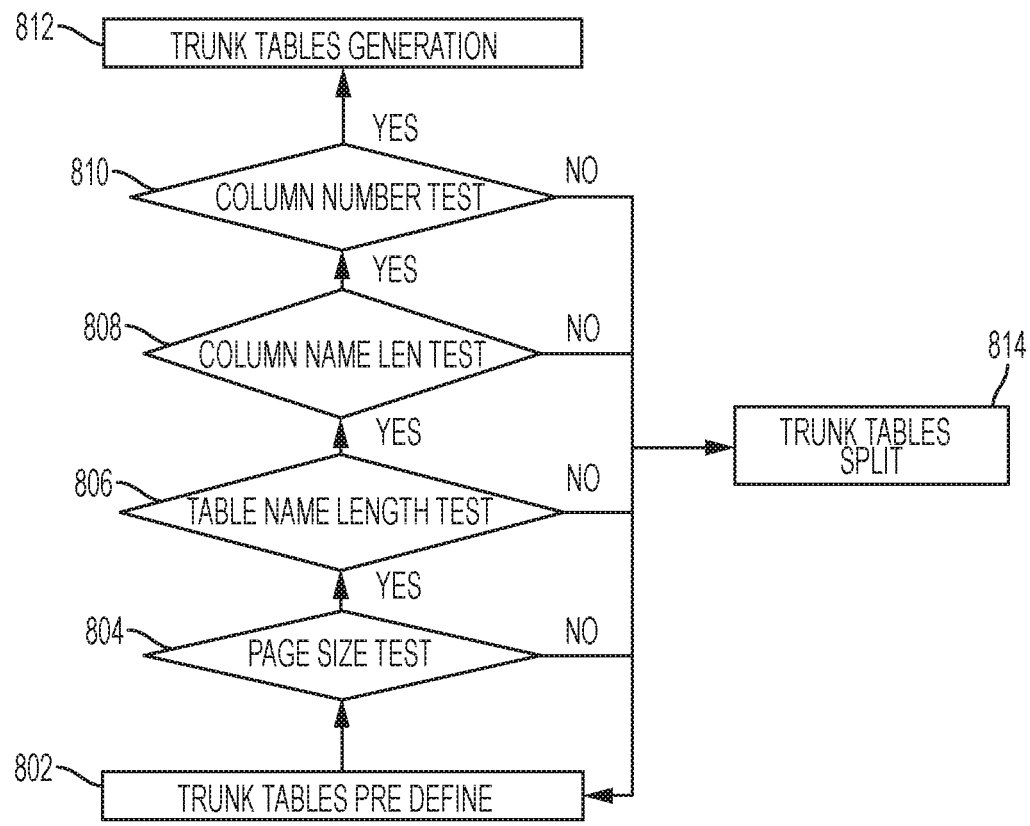
FIG. 8 shows a diagram illustrating validation of trunk table in one embodiment of the present disclosure.

FIG. 8 shows a diagram illustrating validation of trunk table in one embodiment of the present disclosure. For a trunk table that is predefined at 802, each of the constraint tests 804, 806, 808, 810, may be performed. If the constraint tests are satisfied, table generation is performed at 812. If any one of the constraint tests fails, the trunk table may be split at 814.

FIGS. 9A, 9B and 9C illustrate tables that are split based on detected association relationships in one embodiment of the present disclosure. For instance, object1_table shown in FIG. 7B may be split into object1_table shown in FIG. 9A and object1_address table shown in FIG. 9B. Object orders1_table shown in FIG. 7C remains validated as shown in FIG. 9C.

Referring to FIG. 5, at 514, the validated tables are generated as RDB tables, and a corresponding trunk JSON template is generated based on the generated RDB tables. FIG. 10C shows an example of a trunk JSON template generated based on the two RDB tables shown in FIG. 10A and FIG. 10B in one embodiment of the present disclosure.

At 516, JSON data structure document, for example, also received at is filtered by the generated trunk template. At 518, data from the JSON document is loaded into the trunk RDB tables. At 520, the remaining data (not in the trunk template) is loaded in an overflow table.

The trunk tables generated at 514, the data loaded into trunk at 518 and data loaded in overflow at 520 may be stored in a storage device, for example, data warehouse 522.

Figure 11A:
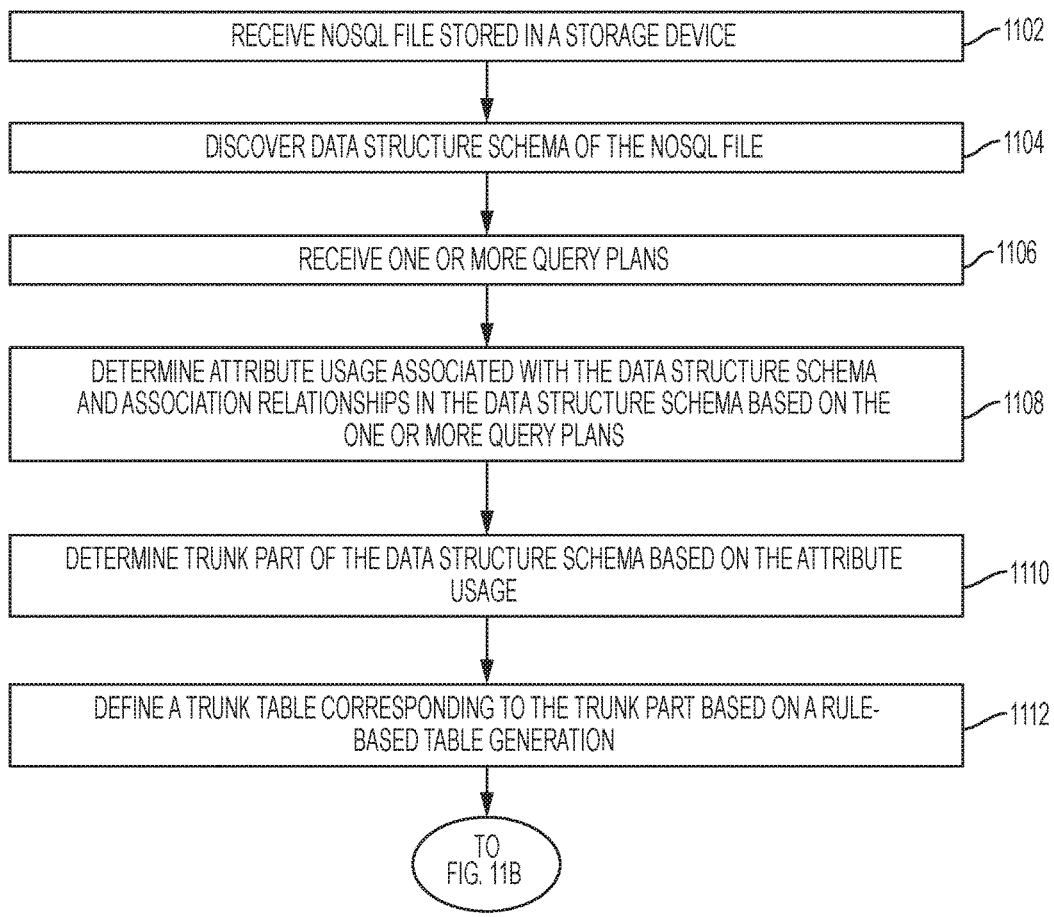
FIGS. 11A and 11B show a flow diagram illustrating a method of moving NoSQL data store to an RDB system in one embodiment of the present disclosure.
Figure 11B:
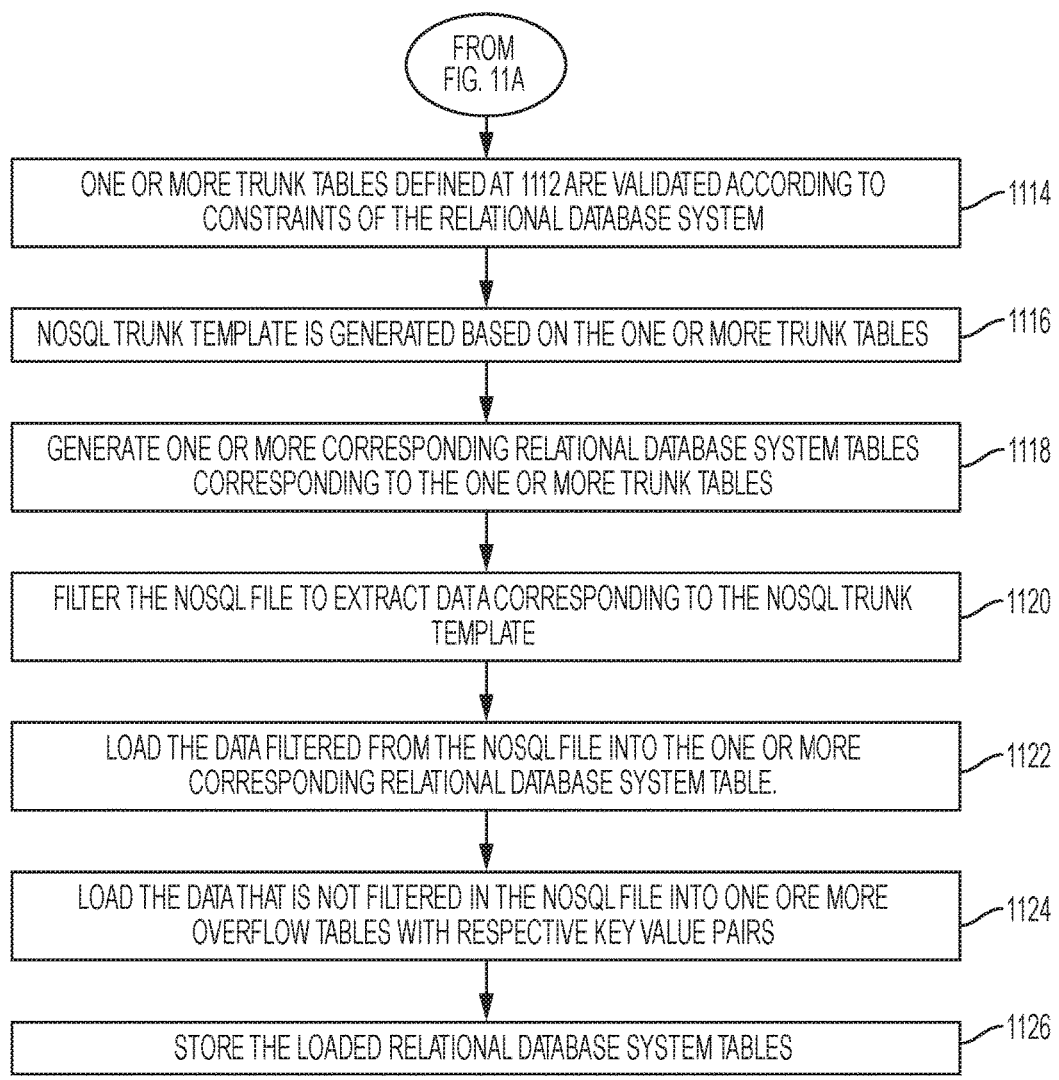

FIGS. 11A and 11B show a flow diagram illustrating a method of moving NoSQL data store to an RDB system in one embodiment of the present disclosure. The method may be performed by one or more hardware processors. At 1102, NoSQL document or file stored in a storage device is received. At 1104, data structure schema of the NoSQL file is discovered, e.g., by performing automatic text analysis of the NoSQL file. For instance, a computer processor may first remove the value of each record and recognize whether the schema of this record is a new one.

At 1106, one or more query plans associated with the record in NoSQL are received. Query plans, for example, are retrieved from a log that tracks the user behavior in the corresponding record.

At 1108, one or more query plans are analyzed and attribute usage associated with the data structure schema and association relationships in the data structure schema are determined, e.g., based on one or more instructions in the query plans. The analysis, for example, may include text analysis automatically performed by a computer or hardware processor.

At 1110, trunk part of the data structure schema is determined based on the attribute usage. For example, the trunk part may include the data structure that is determined to be frequently used, for example, based on a defined threshold frequency value.

At 1112, one or more trunk tables corresponding to the trunk part based on a rule-based table generation may be defined.

At 1114, one or more trunk tables defined at 1112 are validated according to constraints of the relational database system. For example, as shown in FIG. 8, it is determined whether the trunk table meets constraints of the relational database system and one or more trunk tables may be split into a plurality of trunk tables until all tables meet the constraints. Constraints may include, for example, satisfying the size requirements such as the number of columns, column name length, and other constraints. For example, for those trunk tables that do not meet the constraints, they may be split until the split tables meet the constraints.

At 1116, a NoSQL trunk template is generated based on the one or more trunk tables.

At 1118, one or more corresponding relational database system tables corresponding to the one or more trunk tables are generated.

At 1120, the NoSQL file is filtered to extract data corresponding to the NoSQL trunk template.

At 1122, the data filtered from the NoSQL file is loaded into the one or more corresponding relational database system table.

At 1124, the data that is not filtered in the NoSQL file is loaded, into one or more overflow tables (RBD table) with respective key value pairs.

At 1126, one or more relational database system tables loaded at 1122 are stored in a storage system, for example, a data warehouse.

Figure 12:
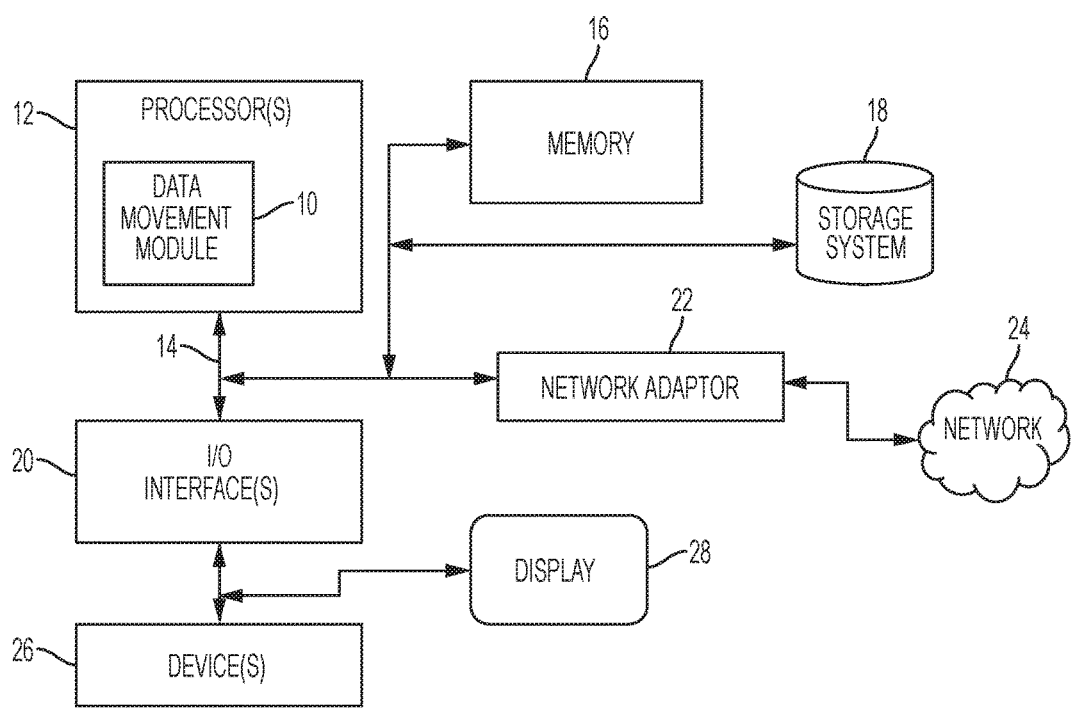
FIG. 12 illustrates a schematic of an example computer or processing system that may implement a data movement system in one embodiment of the present disclosure.

FIG. 12 illustrates a schematic of an example computer or processing system that may implement data movement system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 12 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a data movement module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automatically moving NoSQL data store to a relational database system, the method performed on one or more processors, comprising:
   receiving NoSQL file stored in a storage device;
   discovering data structure schema of the NoSQL file, wherein the data structure schema of the NoSQL file that is discovered comprises objects and arrays, and objects and arrays embedded in one another;
   receiving one or more query plans associated with one or more records in the NoSQL file;
   determining attribute usage associated with the data structure schema and association relationships in the data structure schema based on the one or more query plans;
   determining trunk part of the data structure schema based on the attribute usage, the trunk part comprising attributes that occur in the query plan at least a defined threshold number of times;
   defining one or more trunk tables corresponding to the trunk part based on a rule-based table generation; wherein the rule-based table generation for an embedded object, comprises unfolding each attribute individually, adding a predefined character between names at each level, for the arrays, the rule-based table generation comprises, extracting the arrays and storing the arrays vertically so that each value is in its own row and for an embedded object in an array, the rule-based table generation comprises extracting arrays of complex objects and storing the arrays vertically so that each object is flattened;

validating the one or more trunk tables according to constraints of the relational database system, the constraints comprising satisfying size requirements comprising a page size, length of table name, a number of columns and column name length associated with the relational database system, wherein the one or more trunk tables that exceed the size requirements for at least one of the page size, the number of columns, length of table name and column name length associated with the relational database system are split into additional trunk tables;

generating one or more corresponding relational database system tables corresponding to the one or more trunk tables;

generating a NoSQL trunk template based on the one or more trunk tables;

filtering the NoSQL file to extract data corresponding to the NoSQL trunk template;

loading the data filtered from the NoSQL file into the one or more corresponding relational database system table; and loading the data that is not filtered in the NoSQL file into an overflow table with respective key value pairs.

2. The method of claim 1, wherein the validating comprises:

for each of the one or more trunk tables, determining whether a trunk table meets the constraints of the relational database system;

responsive to determining that the trunk table meets the constraints, creating a relational database system table corresponding to the trunk table;

responsive to determining that the trunk table does not meet the constraints, splitting the trunk table into a plurality of trunk tables based on the association relationships; and iterating the determining, creating and splitting until all of the plurality of trunk tables meet the constraints.

3. The method of claim 1, further comprising storing the one or more corresponding relational database system tables in a data warehouse.

4. A non-transitory computer readable storage medium storing a program of instructions executable by a machine to perform a method of automatically moving NoSQL data store to a relational database system, the method comprising:

receiving NoSQL file stored in a storage device;

discovering data structure schema of the NoSQL file, wherein the data structure schema of the NoSQL file that is discovered comprises objects and arrays, and objects and arrays embedded in one another;

receiving one or more query plans associated with one or more records in the NoSQL file;

determining attribute usage associated with the data structure schema and association relationships in the data structure schema based on the one or more query plans;

determining trunk part of the data structure schema based on the attribute usage, the trunk part comprising attributes that occur in the query plan at least a defined threshold number of times;

defining one or more trunk tables corresponding to the trunk part based on a rule-based table generation, wherein the rule-based table generation for an embedded object, comprises unfolding each attribute individually, adding a predefined character between names at each level, for the arrays, the rule-based table generation comprises, extracting the arrays and storing the arrays vertically so that each value is in its own row and for an embedded object in an array, the rule-based table generation comprises extracting arrays of complex objects and storing the arrays vertically so that each object is flattened;

validating the one or more trunk tables according to constraints of the relational database system, the constraints comprising satisfying size requirements comprising a page size, length of table name, a number of columns and column name length associated with the relational database system, wherein the one or more trunk tables that exceed the size requirements for at least one of the page size, the number of columns, length of table name and column name length associated with the relational database system are split into additional trunk tables;

generating one or more corresponding relational database system tables corresponding to the one or more trunk tables;

generating a NoSQL trunk template based on the one or more trunk tables;

filtering the NoSQL file to extract data corresponding to the NoSQL trunk template;

loading the data filtered from the NoSQL file into the one or more corresponding relational database system table; and loading the data that is not filtered in the NoSQL file into an overflow table with respective key value pairs; and storing the one or more corresponding relational database system tables on a storage device.

5. The non-transitory computer readable storage medium of claim 4, further comprising storing the one or more corresponding relational database system table loaded with filtered data in a data warehouse.

6. The non-transitory computer readable storage medium of claim 4, wherein the validating comprises:

for each of the one or more trunk tables, determining whether a trunk table meets the constraints of the relational database system;

responsive to determining that the trunk table meets the constraints, creating a relational database system table corresponding to the trunk table; responsive to determining that the trunk table does not meet the constraints, splitting the trunk table into a plurality of trunk tables based on the association relationships; and iterating the determining, creating and splitting until all of the plurality of trunk tables meet the constraints.

7. A system of moving NoSQL data store to a relational database system tables, comprising:

one or more hardware processors; one or more of the hardware processors operable to receive NoSQL file stored in a storage device, one or more of the hardware processors further operable to discover data structure schema of the NoSQL file, one or more of the hardware processors further operable to receive one or more query plans associated with one or more records in the NoSQL file, one or more of the hardware processors further operable to determine attribute usage associated with the data structure schema and association relationships in the data structure schema based on the one or more query plans, wherein the data structure schema of the NoSQL file comprises objects and arrays, and objects and arrays embedded in one another;

one or more of the hardware processors further operable to determine trunk part of the data structure schema based on the attribute usage, the trunk part comprising attributes that occur in the query plan at least a defined threshold number of times, one or more of the hardware processors further operable to define one or more trunk tables corresponding to the trunk part based on a rule-based table generation, wherein the rule-based table generation for an embedded object, comprises unfolding each attribute individually, adding a predefined character between names at each level, for the arrays, the rule-based table generation comprises, extracting the arrays and storing the arrays vertically so that each value is in its own row and for an embedded object in an array, the rule-based table generation comprises extracting arrays of complex objects and storing the arrays vertically so that each object is flattened;

one or more of the hardware processors further operable to validate the one or more trunk tables according to constraints of the relational database system, the constraints comprising satisfying size requirements comprising a page size, length of table name, a number of columns and column name length associated with the relational database system, wherein the one or more trunk tables that exceed the size requirements for at least one of the page size, the number of columns, length of table name and column name length associated with the relational database system are split into additional trunk tables;

one or more of the hardware processors further operable to generate one or more corresponding relational database system tables corresponding to the one or more trunk tables;

one or more of the hardware processors further operable to generate a NoSQL trunk template based on the one or more trunk tables;

one or more of the hardware processors further operable to filter the NoSQL file to extract data corresponding to the NoSQL trunk template;

one or more of the hardware processors further operable to load the data filtered from the NoSQL file into the one or more corresponding relational database system table; and one or more of the hardware processors further operable to load the data that is not filtered in the NoSQL file into an overflow table with respective key value pairs;

a storage device coupled to one or more of the processors, and one or more of the hardware processors further operable to store the one or more corresponding relational database system tables on the storage device.

8. The system of claim 7, wherein one or more of the hardware processors are further operable to load the data that is not filtered in the NoSQL file into an overflow table with respective key value pairs.

9. The system of claim 7, wherein one or more of the hardware processors are further operable to store the one or more corresponding relational database system tables loaded with filtered data in a data warehouse.

10. The system of claim 7, wherein the one or more of the hardware processors validate the one or more trunk tables by, for each of the one or more trunk tables, determining whether a trunk table meets the constraints of the relational database system;

responsive to determining that the trunk table meets the constraints, creating a relational database system table corresponding to the trunk table;

responsive to determining that the trunk table does not meet the constraints, splitting the trunk table into a plurality of trunk tables based on the association relationships;

and iterating the determining, creating and splitting until all of the plurality of trunk tables meet the constraints.

* * * * *